(12) United States Patent
Miyata et al.

(10) Patent No.: US 6,946,831 B2
(45) Date of Patent: Sep. 20, 2005

(54) NONCONTACT ROTARY POSITION SENSOR AND ELECTRIC CONTROL THROTTLE VALVE APPARATUS HAVING NONCONTACT ROTARY POSITION

(75) Inventors: Kenji Miyata, Hitachinaka (JP); Masanori Kubota, Hitachinaka (JP); Kenji Ono, Mito (JP); Takahiro Shimura, Mito (JP); Takekazu Ootsuka, Naka-machi (JP); Hisashi Yukita, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 36 days.

(21) Appl. No.: 10/390,679

(22) Filed: Mar. 19, 2003

(65) Prior Publication Data

US 2004/0085062 A1 May 6, 2004

(30) Foreign Application Priority Data

Oct. 30, 2002 (JP) .................................. 2002-315221

(51) Int. Cl.[7] ............................................... G01B 7/30
(52) U.S. Cl. ............................. 324/207.25; 324/207.2; 123/617
(58) Field of Search ..................... 324/207.25, 207.2, 324/207.21, 207.22, 174; 123/617; 338/32 R

(56) References Cited

U.S. PATENT DOCUMENTS

| 5,528,139 | A | 6/1996 | Oudet et al. |
| 5,789,917 | A | 8/1998 | Oudet et al. |
| 6,137,288 | A | 10/2000 | Luetzow |
| 6,448,762 | B1 * | 9/2002 | Kono et al. ............... 324/207.2 |
| 6,559,637 | B2 * | 5/2003 | Miyata et al. ........... 324/207.2 |

FOREIGN PATENT DOCUMENTS

| JP | 8-35809 | 2/1996 |
| JP | 2000-28314 | 1/2000 |

* cited by examiner

*Primary Examiner*—Bot Ledynh
*Assistant Examiner*—Reena Aurora
(74) *Attorney, Agent, or Firm*—Crowell & Moring LLP

(57) ABSTRACT

There is provided a compact, noncontact rotary position sensor that accurately detects a rotary position of a rotating object. A magnetism throttling portion is provided in a midway point of a magnetic path. Two magnetic induction elements are disposed adjacently each other at the magnetism throttling portion. This arrangement effectively allows a magnetic flux to converge at the location, at which the magnetic induction elements are mounted. A noncontact rotary position sensor offering high sensitivity and high accuracy can then be obtained. It is also possible to simplify routing of signal lines from the two magnetic induction elements, since the two magnetic induction elements are adjacent to each other.

11 Claims, 15 Drawing Sheets

FIG.15
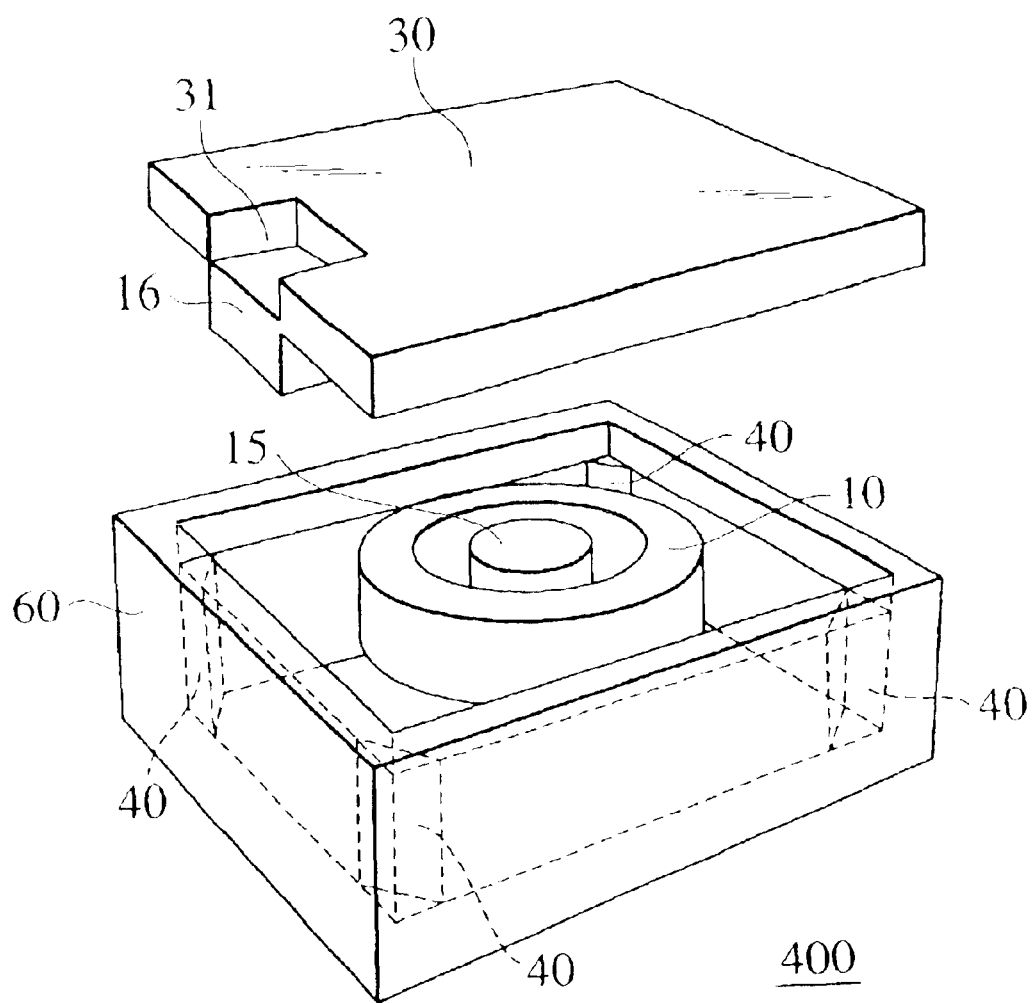
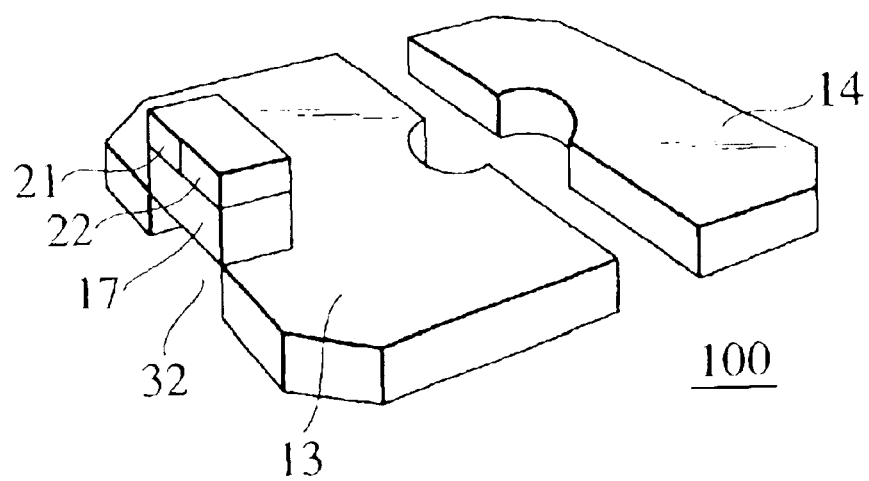

A CHARACTERISTIC
(IN-PHASE OUTPUT)

B CHARACTERISTIC
(CROSS OUTPUT)

NONCONTACT ROTARY POSITION SENSOR AND ELECTRIC CONTROL THROTTLE VALVE APPARATUS HAVING NONCONTACT ROTARY POSITION

BACKGROUND OF THE INVENTION

The present invention relates to a rotary position sensor that detects, for example, a rotating angle of a throttle shaft of a throttle valve for an internal combustion engine or a depression angle of an accelerator pedal. More specifically, it relates to a noncontact rotary position sensor. The present invention also relates to a throttle valve assembly provided with such a noncontact rotary position sensor.

A position sensor disclosed in Patent Document 1 below is known as a conventional rotary position sensor of this type.

In the art of sensors of this type, there are generally mounted two magnetic induction elements so as to detect breakdown of one of the two elements and to provide a backup should one of the elements fail.

[Patent Document 1]
   U.S. Pat. No. 5,528,139

The position sensor disclosed in this patent is provided with two magnetic induction elements disposed 180 degrees apart from each other on the circumference of a stator. As a result, two signal lines from the magnetic induction elements must be wired from their respective positions placed apart from each other, which hinders mass production.

SUMMARY OF THE INVENTION

It is therefore an object of the present invention to provide a noncontact rotary position sensor that, while having sufficient performance as a noncontact rotary position sensor, allows two magnetic induction elements to be disposed adjacently each other.

To achieve the foregoing object, a noncontact rotary position sensor according to one aspect of the present invention has the following arrangement. Specifically, a throttle portion for allowing a magnetic flux to converge is provided in part of a magnetic path on the side of stators that are disposed so as to sandwich a permanent magnet forming a rotor therebetween. Two magnetic induction elements are then disposed in parallel with each other or one on top of the other at the magnetic flux converging portion.

Another aspect of the present invention has the following arrangement. That is, a permanent magnet is mounted on one end of a rotary shaft and a stator assembly that sandwiches the permanent magnet so as to form a magnetic path is mounted on a plastic cover that is, in turn, mounted on a main body. Further, the stator assembly is provided with a throttle portion, which allows a magnetic flux to converge. Then, two magnetic induction elements are disposed in parallel with each other or one on top of the other at this magnetic flux converging portion.

Still another aspect of the present invention has the following arrangement. Specifically, a permanent magnet is mounted on one end of a throttle shaft and a stator assembly that sandwiches the permanent magnet so as to form a magnetic path is mounted on a plastic gear cover that is in turn mounted on a main body (a throttle body). Further, a throttle portion, which allows a magnetic flux to converge, is provided in the stator assembly. Then, two magnetic induction elements are disposed in parallel with each other or one on top of the other at this magnetic flux converging portion. A plurality of conductors that are to be connected to input/output terminals of a motor, are insert-molded in the gear cover, in addition to input/output terminals of the magnetic induction elements. Ends of these conductors are disposed at connectors provided in the gear cover.

BRIEF DESCRIPTION OF THE DRAWINGS

Other objects and advantages of the invention will become apparent from the following description of embodiments with reference to the accompanying drawings in which:

FIG. 15 is an exploded perspective view of a noncontact rotary position sensor according to a third embodiment of the present invention;

DETAILED DESCRIPTION OF THE PREFERRED EMBODIMENTS

A first preferred embodiment of the present invention will be explained with reference to FIGS. 1 through 6.

Figure 1:
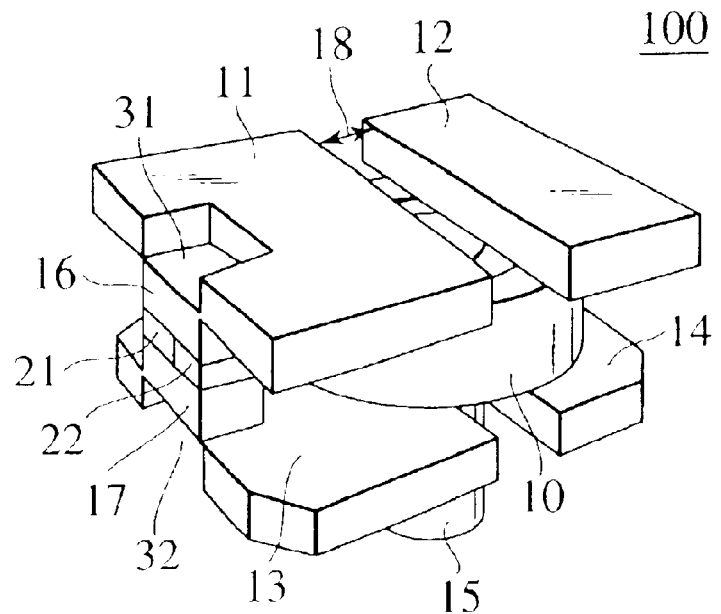
FIG. 1 is a perspective view of a noncontact rotary position sensor according to a first embodiment of the present invention.
Figure 2:
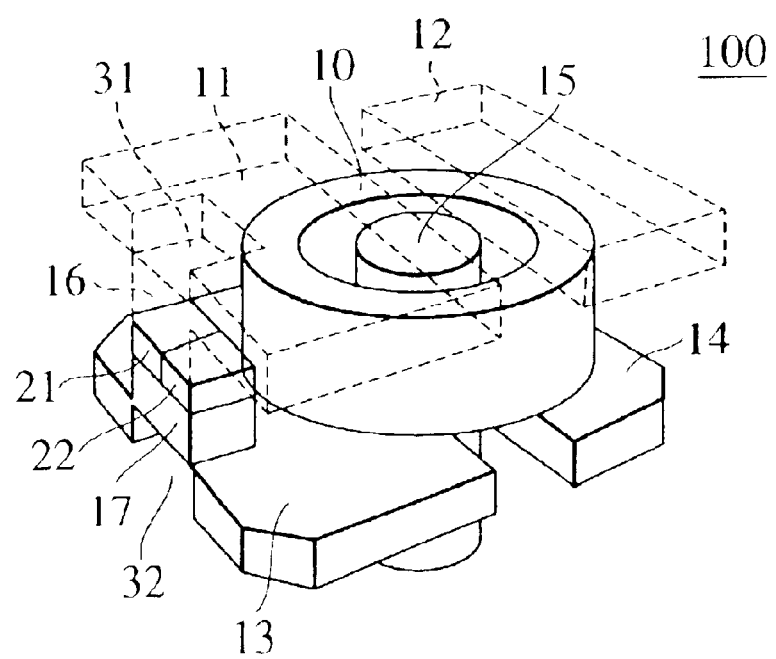
FIG. 2 is a perspective view of the internal construction of the noncontact rotary position sensor according to the first embodiment of the present invention.

FIG. 1 is a perspective view of a noncontact rotary position sensor according to the first embodiment of the present invention. FIG. 2 is a perspective view of the internal construction of the noncontact rotary position sensor according to the first embodiment of the present invention. Referring to FIGS. 1 and 2, the first embodiment has the following arrangement. Specifically, a rotor is formed of a ring-like or annular permanent magnet 10 and a shaft (rotary shaft) 15 that supports the annular permanent magnet 10 and two pairs of magnetic plates (constituting a magnetic body assembly) 11, 12; 13, 14 sandwich the annular permanent magnet 10 from the upper side and lower side thereof.

The upper magnetic plates 11 and 12 are disposed apart from each other in the horizontal direction. The lower magnetic plates 13 and 14 are disposed in the same manner, being apart from each other in the horizontal direction. This result in an air gap 18 being defined between the two magnetic plates 11 and 12.

The magnetic plates 11 and 13 are respectively provided with protruding magnetic bodies 16 and 17, which form a magnetic flux throttling portion (a magnetic flux converging portion) on the outer circumferential portion of the annular permanent magnet 10. Two Hall elements 21 and 22, a type of magnetic induction element, are disposed between the protruding magnetic bodies 16 and 17. Protruding magnetic bodies may be disposed between the magnetic plates 12 and 14 in the same manner as with the magnetic plates 11 and 13, but that is not mandatory. It should also be noted that the intended function can be achieved even with only either the Hall element 21 or the Hall element 22; however, for the purpose of a mutual backup in case of failure or a diagnostic check, both of the two Hall elements are used in the embodiment. In addition, the protruding magnetic bodies 16 and 17 for forming the magnetic flux throttling portion (magnetic flux converging portion) may be formed integrally with the magnetic plates 11 and 13, respectively, or separately and later attached thereto through bonding or welding.

Figure 6:
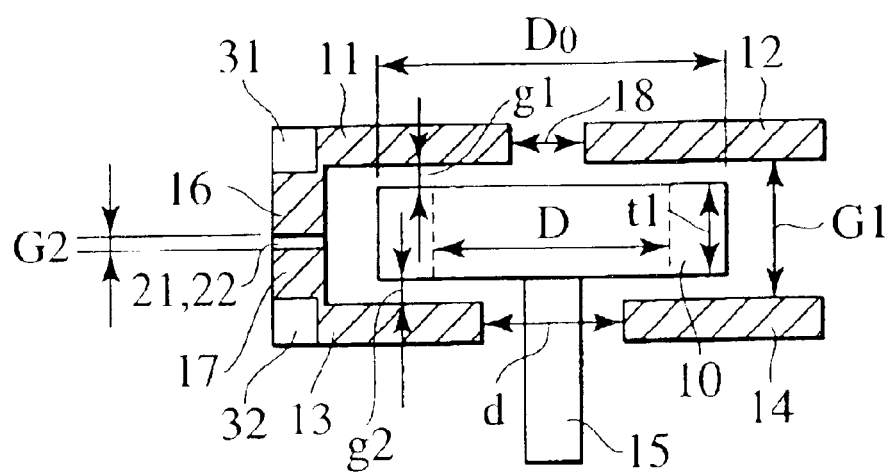
FIG. 6 is a cross-sectional view of the noncontact rotary position sensor according to the first embodiment of the present invention.

FIG. 6 is a front elevational view showing the rotary position sensor according to the first embodiment of the present invention.

The magnetic plates 11 and 13 face each other with a substantially uniform gap G1. Similarly, the magnetic plates 12 and 14 face each other with a substantially uniform gap G1.

There is provided a uniform small gap g1 between the magnetic plate 11, 12 and the top surface of the annular permanent magnet 10. Likewise, there is provided a uniform small gap g2 between the magnetic plate 13, 14 and the bottom surface of the annular permanent magnet 10.

As a result, the gap G1 is equivalent to a distance obtained by adding a thickness t1 of the annular permanent magnet to the small gaps g1 and g2.

A gap between the protruding magnetic bodies 16 and 17 is smaller than the thickness t1 of the annular permanent magnet 10.

The air gap 18 between the magnetic plates 11 and 12 may be eliminated, which will be described later.

It is preferable that a diameter d of an insertion hole provided between the magnetic plates 13 and 14, through which the shaft 15 is inserted, be smaller than an outer diameter D0 of the annular permanent magnet 10 and desirably, smaller than an inner diameter D of the annular permanent magnet 10. The shaft 15 may or may not be a magnetic body.

The construction of the first embodiment according to the present invention has been described. The flow of magnetic flux in the first embodiment will be next explained to show the principle of the present invention.

Figure 3:
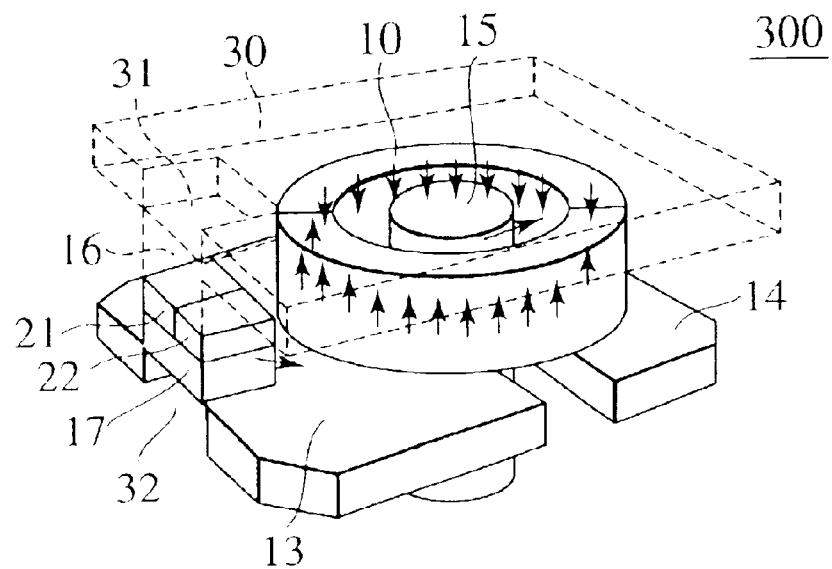
FIG. 3 is a diagram showing a distribution of magnetization of an annular permanent magnet forming a component of the noncontact rotary position sensor according to the first embodiment of the present invention.

As shown by the arrows in FIG. 3, the annular permanent magnet 10 is magnetized substantially in an axial direction of rotation. The direction of magnetization of the annular permanent magnet 10 is substantially upward in a region of 180 degrees in the rotating direction and substantially downward in other regions.

Figure 4:
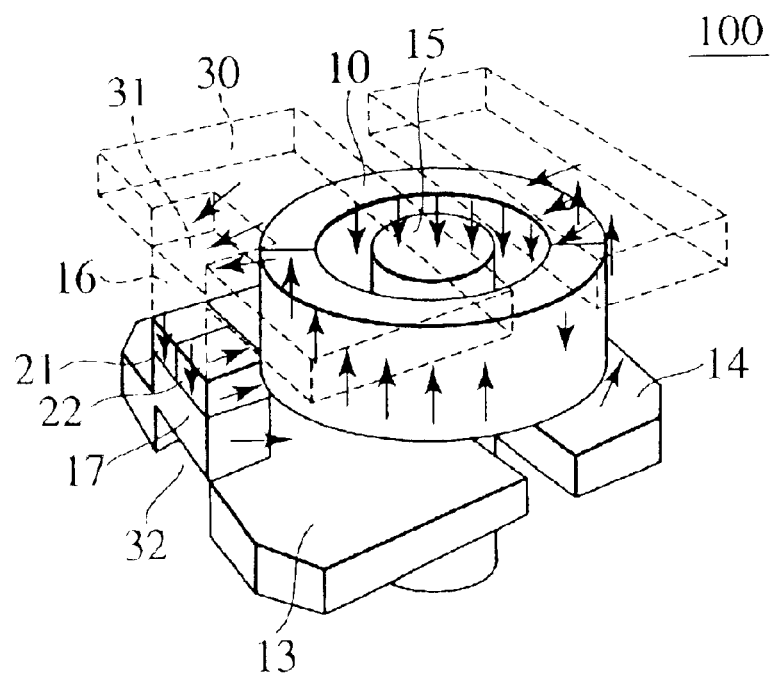
FIG. 4 is a diagram showing a flux density vector distribution of the noncontact rotary position sensor according to the first embodiment of the present invention.

A magnetic flux density vector in this case substantially exhibits a distribution as shown in FIG. 4. Specifically, the lines of a magnetic field produced by the annular permanent magnet 10 are diverted to the upper and lower magnetic plates 11, 12, 13, and 14. Then, part of the magnetic field lines flow through the protruding magnetic bodies 16 and 17 and the Hall elements 21 and 22. The direction and intensity of the magnetic field lines passing through the Hall elements 21 and 22 vary depending on a rotary position of the annular permanent magnet 10.

Figure 5:
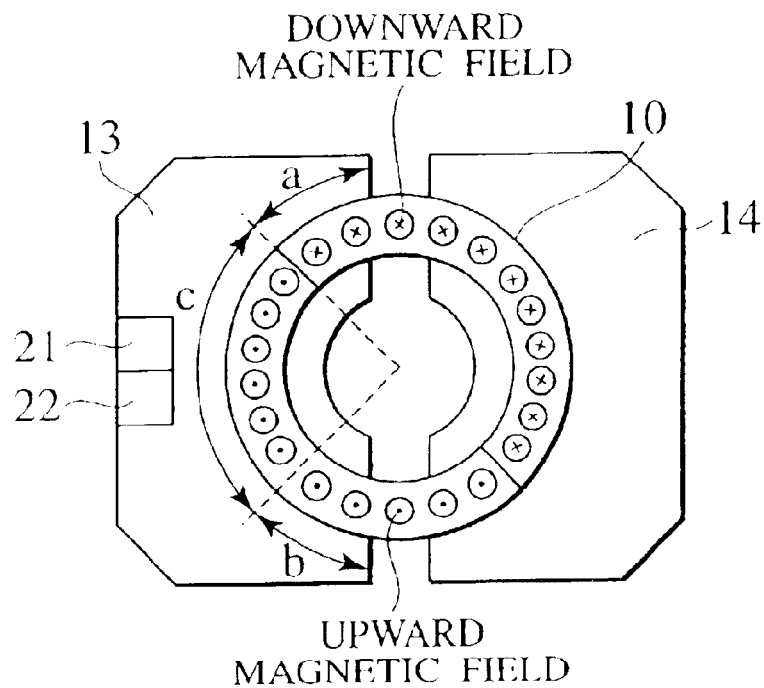
FIG. 5 is a diagram explaining the theory of operation of the noncontact rotary position sensor according to the first embodiment of the present invention.

The relationship between the rotary position of the annular permanent magnet 10 and the amount of flux passing through the Hall element 21 will be explained with reference to FIG. 5. FIG. 5 shows directions of the magnetic field in the annular permanent magnet 10.

With the annular permanent magnet 10 at this rotary position, a region a and a region b has exactly the same opening angle. The directions of the magnetic fields in these regions are opposite to each other. As a result, the magnetic flux from the region a and that from the region b cancel each other. In reality, however, an area near a boundary between the region a and a region c, at which the direction of the distribution of magnetization is inverted, is weak in terms of magnetization and there is no sheer cancellation in the strict sense of the term. Nonetheless, it can be safely said that the magnetic flux from the region a and that from the region c substantially cancel each other.

A good part of the magnetic flux in the remaining region c therefore passes through the protruding magnetic bodies 16, 17 that form a magnetic path having a small magnetic resistance. The amount of the magnetic flux passing through the protruding magnetic bodies 16, 17 is substantially directly proportional to the cross-sectional area occupied by the region c of the permanent magnet 10.

The cross-sectional area occupied by the region c of the annular permanent magnet 10 is proportional to a rotary angle of the annular permanent magnet 10. A flux density detected by the Hall elements 21 and 22 is substantially proportional to the rotary angle of the annular permanent magnet 10. This means that, by sensing the flux density detected by the Hall elements 21 and 22, it is possible to detect the rotary angle of the annular permanent magnet 10, that is, the rotary angle of the shaft 15.

The upper magnetic plates 11 and 12 face the lower magnetic plates 13 and 14, respectively, with the uniform gap G1. In addition, the upper magnetic plates 11, 12 face the annular permanent magnet 10 in such a manner as to keep the uniform gap g1 (upper gap) therebetween. The lower magnetic plates 13, 14 face the permanent magnet 10 in such a manner as to keep the uniform gap g2 (lower gap) therebetween. The gap G1 is larger than the thickness t1 of the annular permanent magnet 10 by the gap g1+gap g2. A gap G2 between the protruding magnetic bodies 16 and 17 is, however, smaller than the thickness t1 of the annular permanent magnet 10. Thanks to this arrangement, it is possible to allow the magnetic flux of the annular permanent magnet 10 to converge at the protruding magnetic bodies 16 and 17. In the sense as described now, the protruding magnetic bodies 16 and 17 can form the magnetic flux throttling portion. To sum up, the point about the first embodiment is that it is possible to allow the magnetic flux to converge at the portion between the magnetic bodies 11 and 13, at which the protruding magnetic bodies 16 and 17 are formed as an area where magnetic flux lines are easy to pass.

When manufacturing the sensor according to the first embodiment at low cost, mounting accuracy at different portions of the sensor is about ±0.2 mm. Considering this fact, effects on characteristics of the sensor due to mounting errors can be minimized if the respective dimensions of the air gap g1 between the annular permanent magnet 10 and the upper magnetic bodies 11, 12 and the air gap g2 between the permanent magnet 10 and the lower magnetic bodies 13, 14 are set to 0.5 mm or more, preferably around 1 mm. This is common to other embodiments of the present invention to be described in the following.

A magnetic material has magnetic hysteresis characteristics to a greater or lesser extent. A magnetic hysteresis effect can generally become conspicuous as the flux density exceeds 0.5 T or 1 T. To ensure high accuracy of rotary position for the rotary position sensor, it is desirable that the sensor be used over as small a range of magnetic hysteresis as possible. It is therefore preferable that the flux density be 0.5 T or less in the inside of the magnetic material, typically in the inside of the magnetic plates 11, 12, 13, and 14. It is further preferable that a magnetic material having a small magnetic hysteresis be used. An example of such a magnetic material is Permalloy (trade name). These observations are common to other preferred embodiments of the present invention to be described in the following.

According to the first embodiment, the permanent magnet is annular or ringshaped. A permanent magnet of a disc shape can still yield the same functions.

Figure 7:
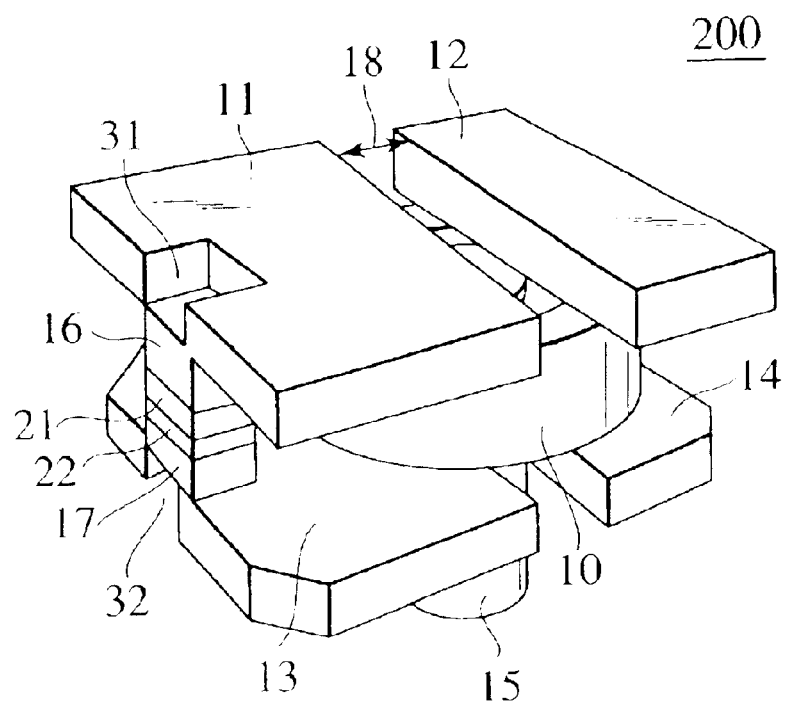
FIG. 7 is a perspective view of a modified example of the noncontact rotary position sensor according to the first embodiment of the present invention.

According to the first embodiment of the present invention, the Hall elements 21 and 22 as the magnetic induction elements are disposed in parallel with each other. The Hall element 21 may nonetheless be overlaid on the Hall element 22, in the gap G2 between the protruding magnetic bodies 16 and 17 as shown in FIG. 7.

Figure 8:
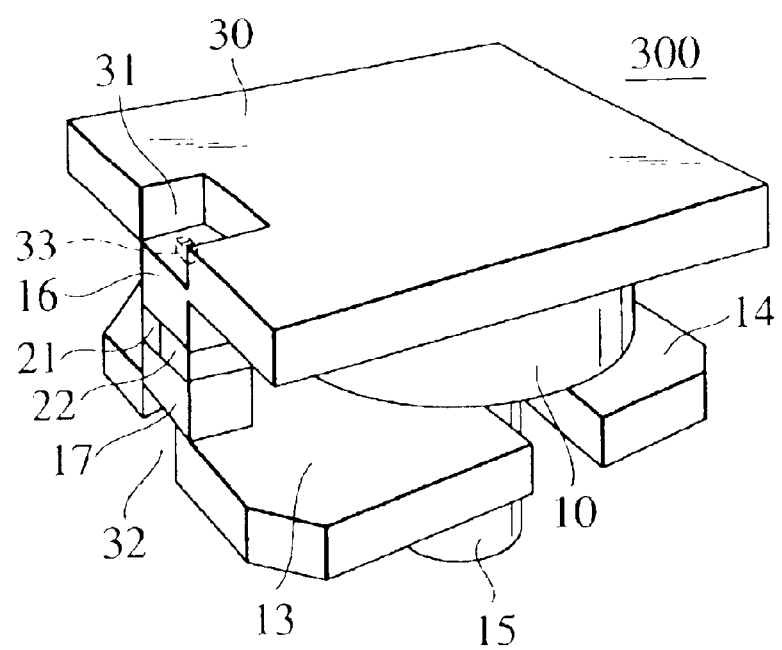
FIG. 8 is a perspective view of a noncontact rotary position sensor according to a second embodiment of the present invention.
Figure 9:
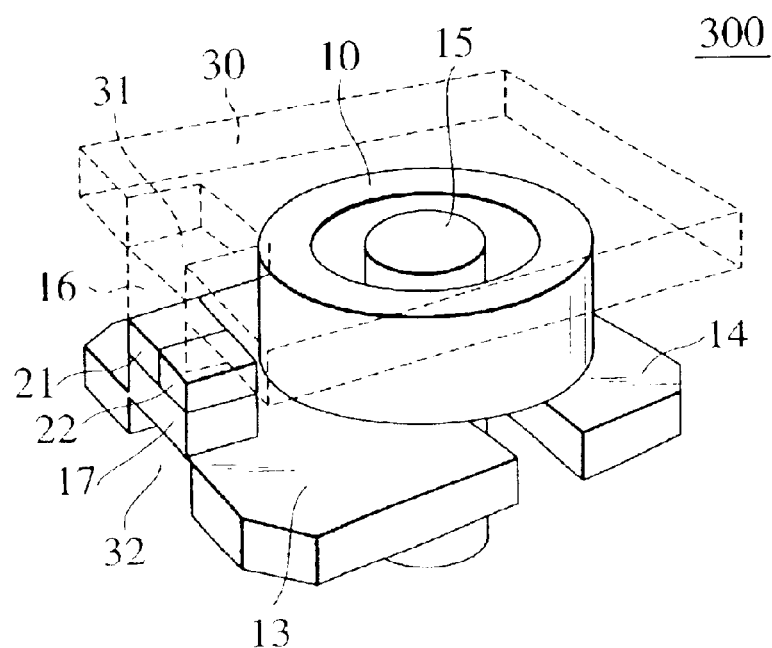
FIG. 9 is a perspective view of the internal construction of the noncontact rotary position sensor according to the second embodiment of the present invention.
Figure 10:
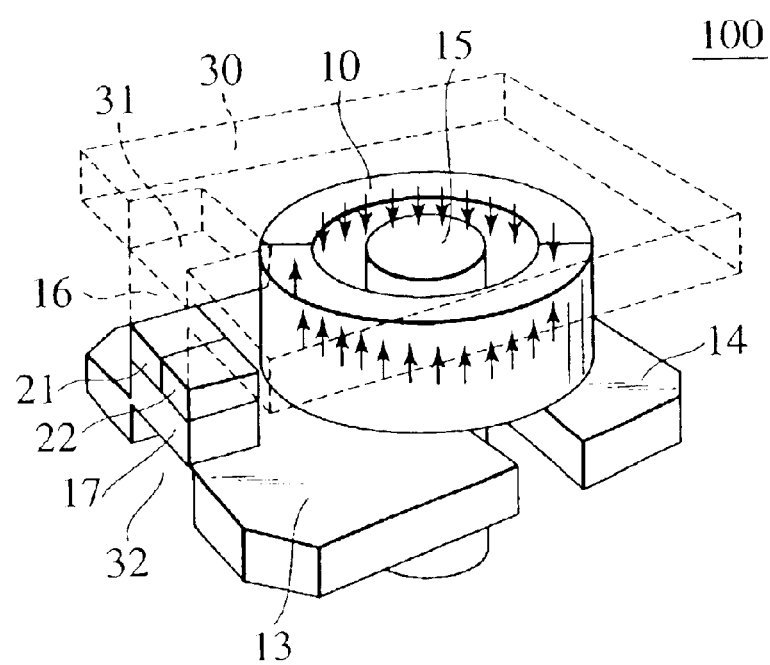
FIG. 10 is a diagram showing a distribution of magnetization of an annular permanent magnet forming a component of the noncontact rotary position sensor according to the second embodiment of the present invention.
Figure 11:
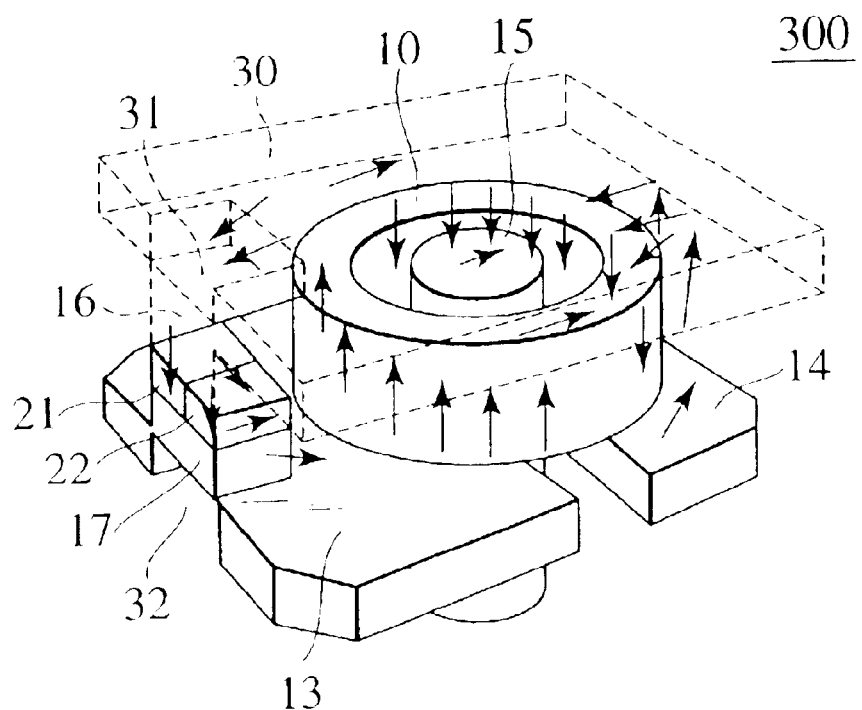
FIG. 11 is a diagram showing a flux density vector distribution of the noncontact rotary position sensor according to the second embodiment of the present invention.
Figure 12:
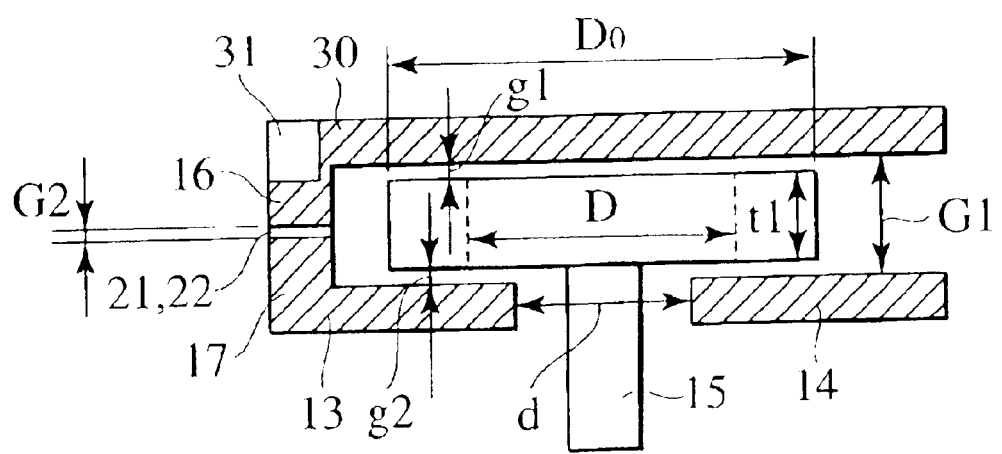
FIG. 12 is a cross-sectional view of the noncontact rotary position sensor according to the second embodiment of the present invention.

A second embodiment of the present invention will be explained with reference to FIGS. 8 through 12. FIG. 8 is a perspective view of a noncontact rotary position sensor according to the second embodiment of the present invention. FIG. 9 is a perspective view illustrating the internal construction of the noncontact rotary position sensor according to this embodiment. As is known from FIGS. 8 and 9, the noncontact rotary position sensor of this embodiment has the same construction as that of the first embodiment, except that an upper magnetic plate 30 is of a single sheet. To divert some of the magnetic flux lines from an annular permanent magnet 10 to protruding magnetic bodies 16 and 17, it is only necessary that either one of the upper and lower magnetic plates is provided with an air gap in the horizontal direction. According to the second embodiment, there is provided the air gap in the horizontal direction between lower magnetic plates 13 and 14. FIG. 10 shows a magnetization distribution of the annular permanent magnet 10. FIG. 11 shows a flux density vector distribution.

According to the second embodiment of the present invention, a magnetic path is formed in the magnetic plate 30 at a portion corresponding to the upper portion of the annular permanent magnet 10. Accordingly, the amount of the flux diverted to the protruding magnetic bodies 16 and 17 is decreased. However, since the upper magnetic plate 30 is of a single sheet, this offers effects of the reduced number of parts used and enhanced ease of manufacturing. In addition, if the rotary position sensor is secured with the use of the bottom surface thereof, the upper portion of the rotary position sensor is exposed to the outside. This yields another benefit of reducing effects on sensor outputs due to entry of a magnetic body from the outside.

Figure 22:
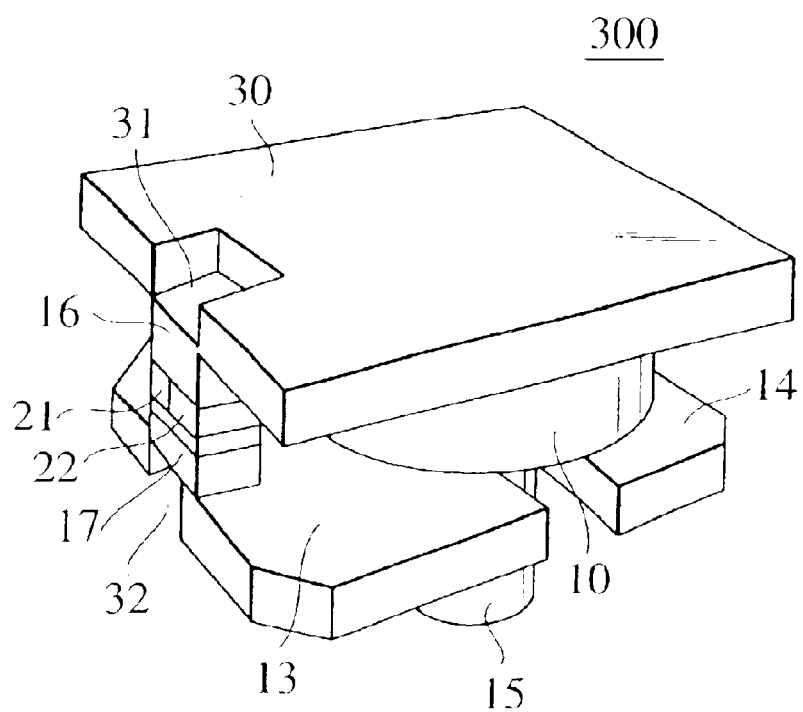
FIG. 22 is a diagram showing another embodiment, in which the recess is of a two-step construction.
Figure 23:
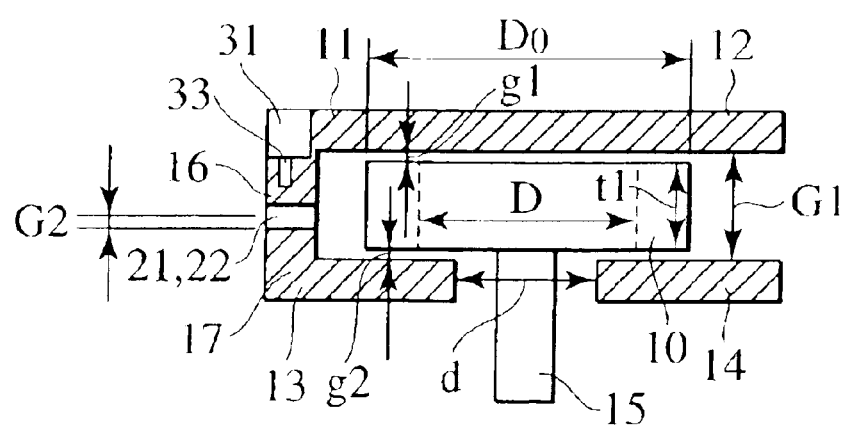
FIG. 23 is a cross-sectional view showing the embodiment of FIG. 22, in which the recess is of a two-step construction.

There is another feature provided commonly in the first and the second embodiment of the present invention. Specifically, recesses 31 and 32 are provided on the respective backsides of the protruding magnetic bodies 16 and 17 provided on the magnetic plates 11 and 30, respectively. These recesses 31 and 32 are not mandatory. Providing the recesses 31 and 32, however, offers a benefit of lessening an adverse effect on the characteristics of the noncontact rotary position sensor due to the magnetic hysteresis of the magnetic plate 11 and 30. Furthermore, another recess 33 continuous with the recess 31 is provided in the protruding magnetic body 16 as shown in FIGS. 22 and 23 so as to form a recess in a two-step or multiple-step construction. This will augment these effects even further.

Figure 13:
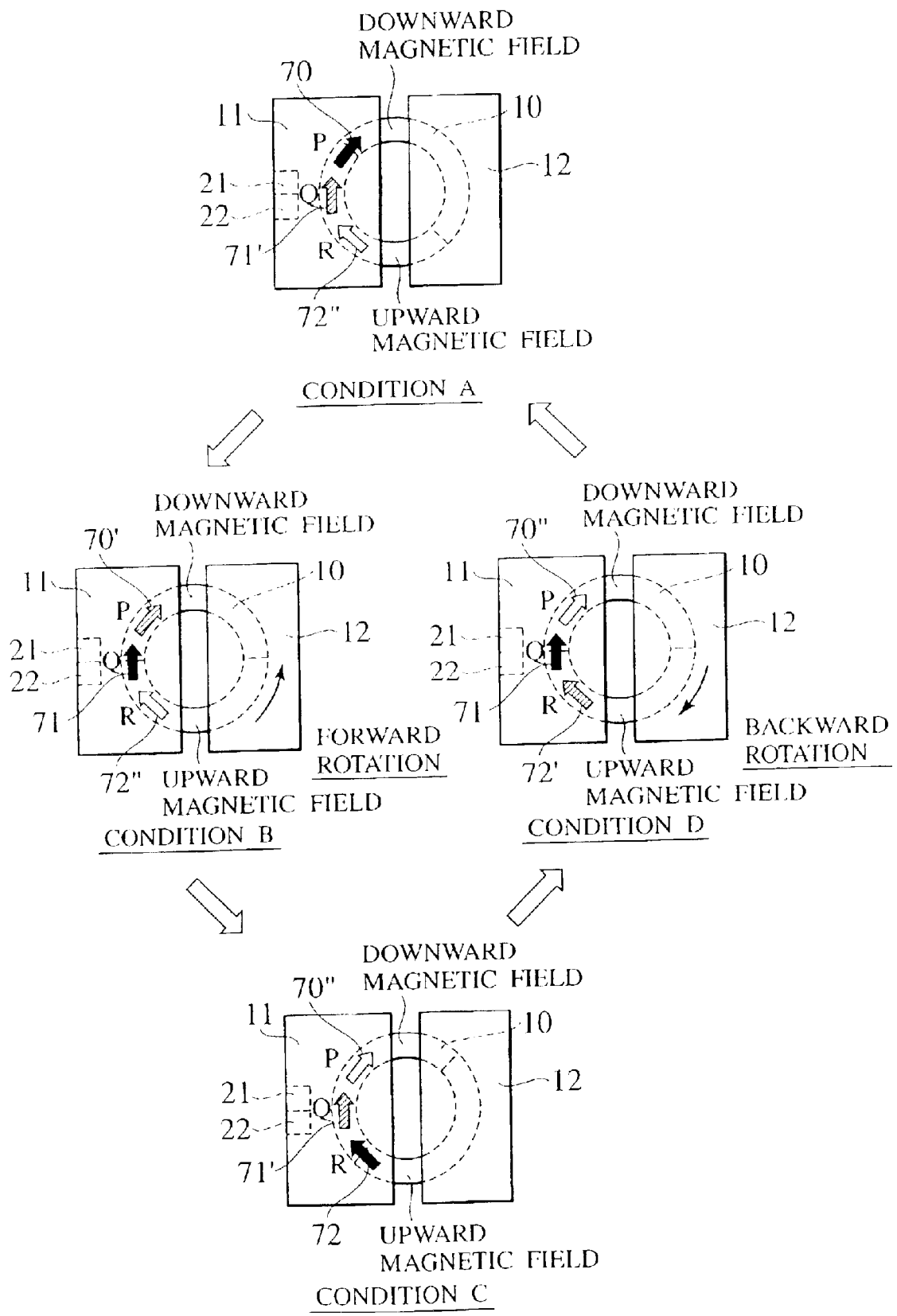
FIG. 13 is a diagram for explaining hysteresis phenomena of signals when there are no recesses provided in the noncontact rotary position sensor according to the preferred embodiments of the present invention.
Figure 14:
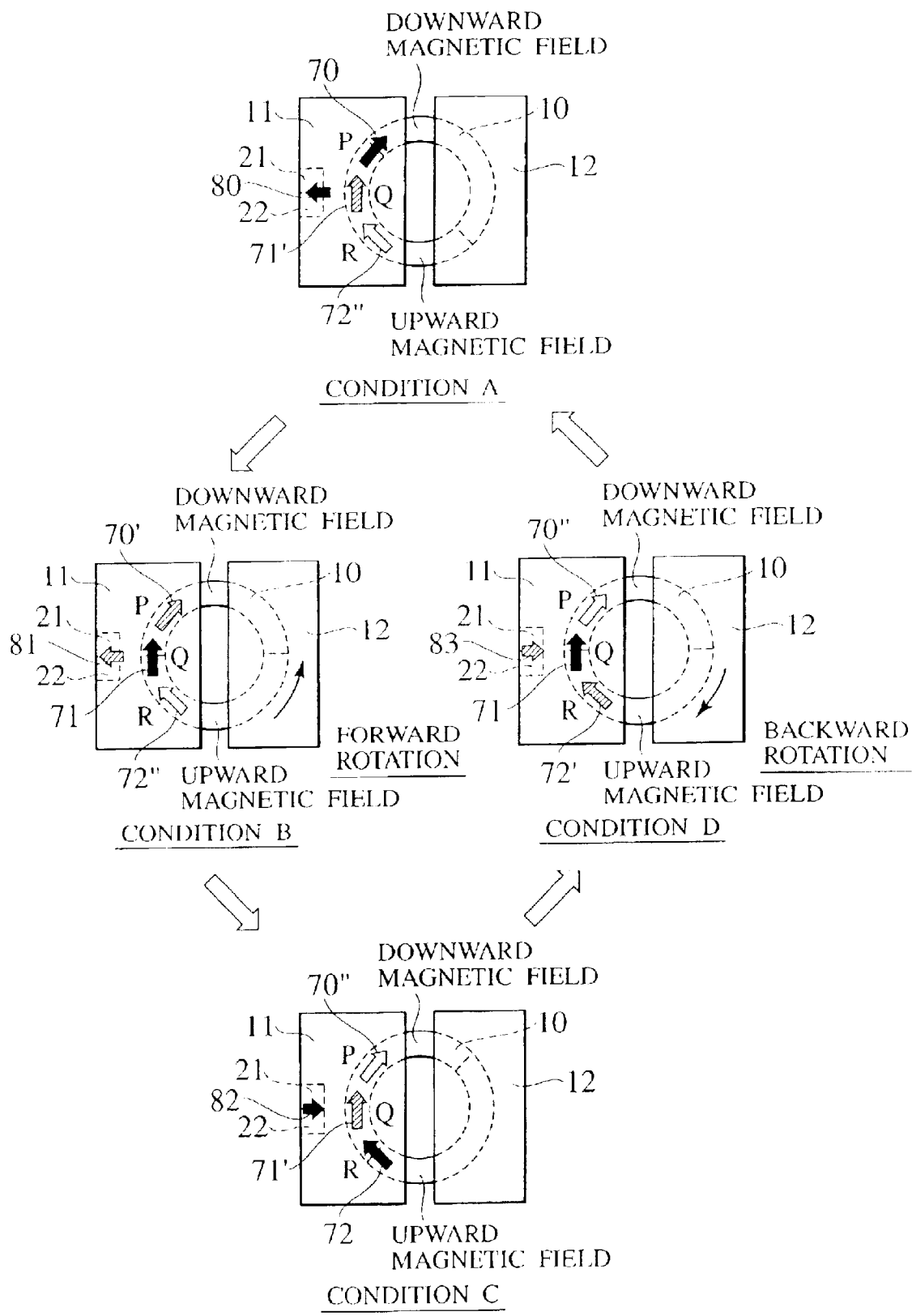
FIG. 14 is a diagram explaining how hysteresis phenomena of signals are lessened when there are recesses provided in the noncontact rotary position sensor according to the preferred embodiments of the present invention.

Physical reasons for this fact will be explained with reference to FIGS. 13 and 14. As the annular permanent magnet 10 rotates, a residual magnetized component due to magnetic hysteresis is left in the upper magnetic plates 11 and 12. The residual magnetized component on the side of the magnetic plate 11 is responsible for affecting the Hall elements 21 and 22 as the magnetic induction elements. FIG. 13 therefore shows only the residual magnetized component on the side of the magnetic plate 11 by means of three different types of broad arrows. A solid arrow, a slant-line arrow and a hollow arrow indicated at a point P, a point Q, and a point R, respectively, represents the magnetized components produced in the magnetic plate 11. The hollow arrow, the slant-line arrow, and the solid arrow indicate the strength of the magnetized components in this order. A counterclockwise turn as viewed from above is called a forward rotation, whereas a clockwise turn is called a backward rotation.

When the annular permanent magnet 10 rotates forward 90 degrees from a condition A shown at the upper portion of FIG. 13, the condition changes via a condition B to a condition C. When the annular permanent magnet 10 then rotates backward 90 degrees, the condition changes from the condition C, via a condition D, back to the condition A.

A magnetized component 70 is produced at the point P of the magnetic plate 11 located at a boundary between an N pole and an S pole of the annular permanent magnet 10. A magnetized component 71' and a magnetized component 72" are also produced at the point Q and the point R, respectively.

When the condition changes to the condition B, the boundary between the N pole and the S pole of the annular permanent magnet 10 moves to the point Q. As a result, the point Q has a magnetized component 71 having the greatest strength. The point P, which had the greatest magnetized component 70 in the previous condition A, has a magnetized component 70' having a greater strength than the point R because of the hysteresis effect involved.

When the condition changes to the condition C, a location corresponding to the boundary between the N pole and the S pole of the annular permanent magnet 10 moves to the point R. As a result, the point R has a magnetized component 72 having the greatest strength. The point Q, which had the greatest magnetized component 71 in the previous condition B, has a magnetized component 71' having a greater strength than the point P because of the hysteresis effect involved.

When the annular permanent magnet 10 turns backward to bring the condition into the condition D, the location corresponding to the boundary between the N pole and the S pole of the annular permanent magnet 10 moves back again to the point Q. As a result, the point Q has the magnetized component 71 having the greatest strength. The point R, which had the greatest magnetized component 72 in the previous condition C, has a magnetized component 72' having a greater strength than the point P because of the hysteresis effect involved.

When the condition returns to the condition A, the location corresponding to the boundary between the N pole and the S pole of the annular permanent magnet 10 moves to the point P. As a result, the point P has the magnetized component 70 having the greatest strength. The point Q, which had the greatest magnetized component 71 in the previous condition D, has the magnetized component 71' having a greater strength than the point R because of the hysteresis effect involved.

As is known from the foregoing description, the strengths of magnetization at the points P and R differ between the condition B and the condition D because of the hysteresis effect involved. This effect is therefore superposed on signal components of the Hall elements 21 and 22.

If the recesses 31 and 32 are provided on the respective backsides of the protruding magnetic bodies 16 and 17 provided on the magnetic plate 30 and the magnetic plate 13, respectively, an opening of the magnetic path at that particular location is narrowed, allowing the magnetic flux to converge. This location is, in FIG. 14, at a portion on the right side of the magnetic flux throttling portion above the Hall elements 21 and 22. This results in the sensor having significant magnetized components 80 through 83 at the magnetic flux throttling portion on the left side of the magnetic plate 11.

Attention will now be focused on the condition B and the condition D.

In the condition B, an upward flux component is produced in the Hall elements 21 and 22 because of imbalance in magnetization between the point P and the point R. When there are provided the recesses 31 and 32, on the other hand, the newly produced magnetized component 81 generates a downward flux component in the Hall elements 21 and 22. The recesses 31 and 32 therefore act to weaken the effect due to the imbalance in magnetization between the point P and the point R.

In the condition D, a downward flux component is produced in the Hall elements 21 and 22 because of imbalance in magnetization between the point P and the point R. If there are provided the recesses 31 and 32, on the other hand, the newly produced magnetized component 83 generates an upward flux component in the Hall elements 21 and 22. Also in the condition D, the recesses 31 and 32 act to weaken the effect due to the imbalance in magnetization between the point P and the point R.

For the reasons given in the foregoing description, providing the recesses 31 and 32 for the magnetic plate 11 lessens an adverse effect on the characteristics of the noncontact rotary position sensor due to the magnetic hysteresis of the magnetic plate 11.

A noncontact rotary position sensor according to a third embodiment of the present invention is described, in which the noncontact rotary position sensor according to the second embodiment of the present invention is housed in a housing. FIG. 15 shows an example of mounting magnetic plates 30, 13, and 14 on a housing 60 made of a non-magnetic material. The corners of the magnetic plates 13 and 14 are beveled off and triangular prisms 40 made of a non-magnetic material are disposed at four corners of the housing 60 to accommodate the magnetic plates 13 and 14 snugly therein. Alternatively, the inside of the housing 60 may, instead, be machined so as to provide such a profile. A bottom plate 101 composed of the magnetic plates 13 and 14 and a protruding magnetic body 17 functioning as a magnetic flux throttling portion are inserted into the inside of the housing 60. An annular permanent magnet 10 secured to a shaft 15 is then inserted and the magnetic plate 30 is placed over the annular permanent magnet 10. The triangular prisms 40 made of a non-magnetic material define, at this time, a gap g1 with a predetermined distance between the magnetic plate 30 and the annular permanent magnet 10.

Figure 16:
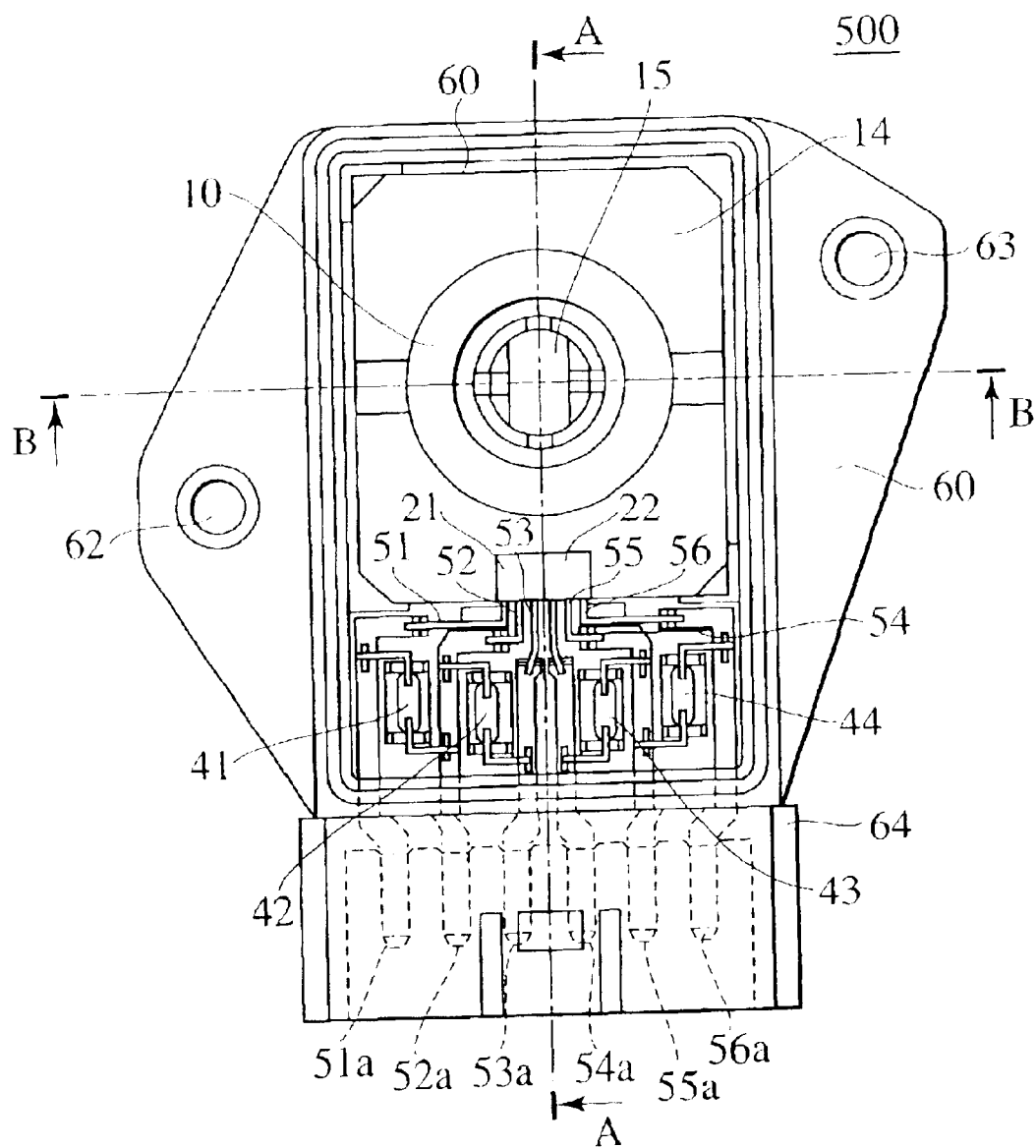
FIG. 16 is a plan view, showing the outside, of a noncontact rotary position sensor according to a fourth embodiment of the present invention.
Figure 17:
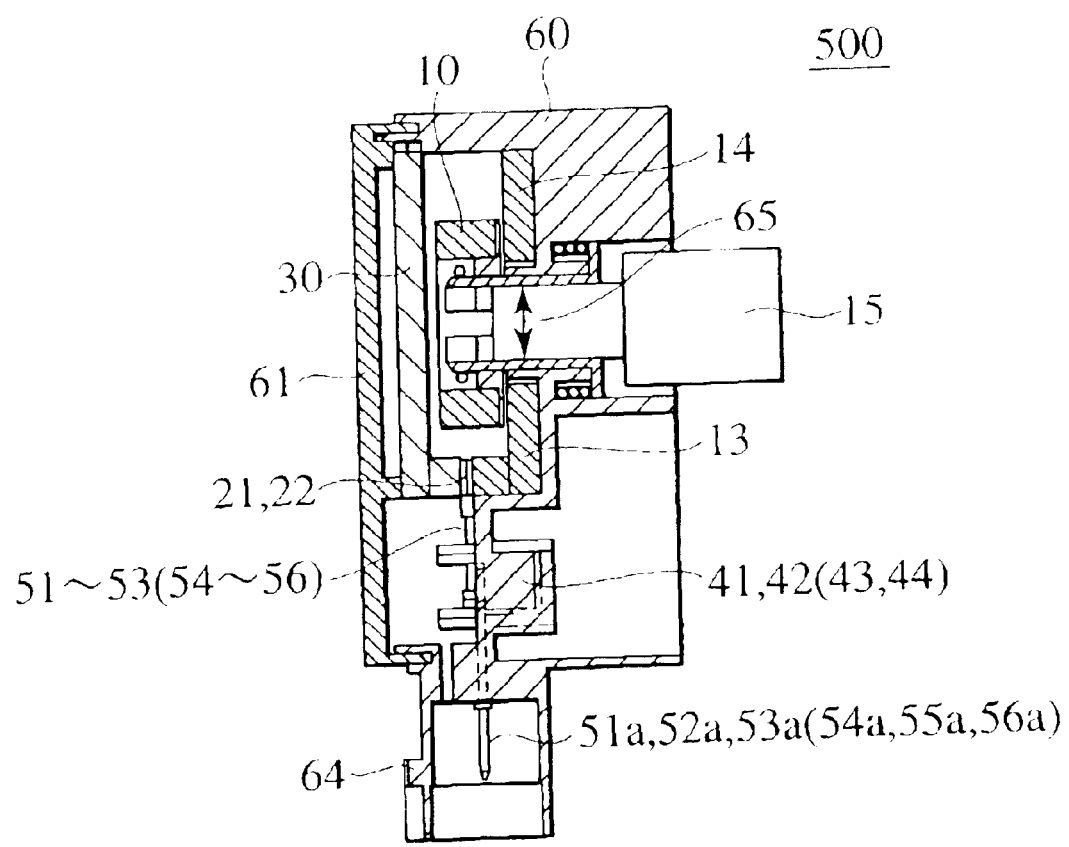
FIG. 17 is a cross-sectional view of the noncontact rotary position sensor according to the fourth embodiment of the present invention, taken along line A—A of FIG. 16.
Figure 18:
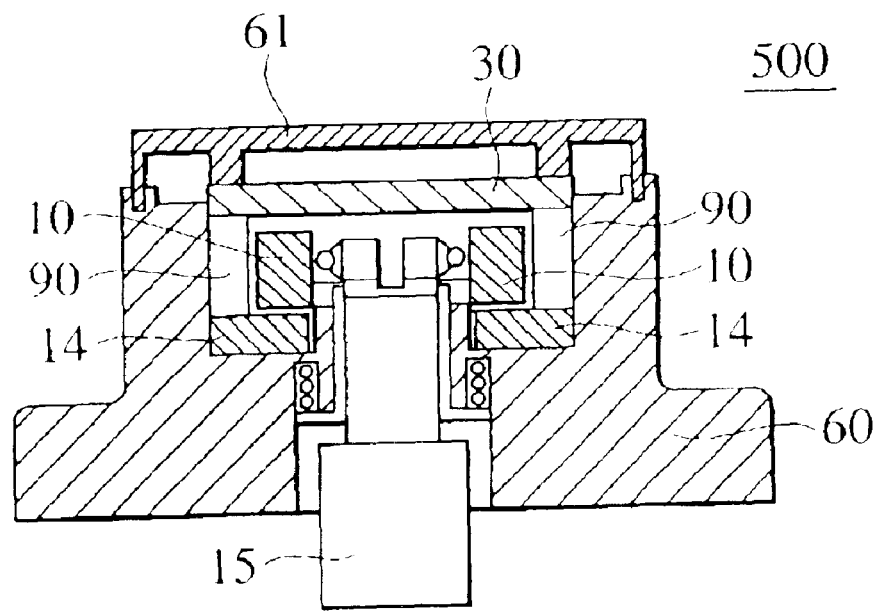
FIG. 18 is a cross-sectional view of the noncontact rotary position sensor according to the fourth embodiment of the present invention, taken along line B—B of FIG. 16.

A fourth embodiment of the present invention is described in which the noncontact rotary position sensor according to the second embodiment of the present invention is applied, for example, to an actual vehicle as a rotary position sensor detecting the depression amount of an accelerator pedal thereof. FIG. 16 is a top plan view of the apparatus according to the fourth embodiment of the present invention. FIG. 17 is a cross-sectional view taken along line A—A of FIG. 16 and FIG. 18 is a cross-sectional view taken along line B—B of FIG. 16.

Referring to FIG. 16, a housing 60 of a device, the rotary angle of which is to be detected, is provided with a rotary shaft through hole 65 for allowing a rotary shaft to extend to the outside. A magnetic plate 13 mounted with a protruding magnetic body 17, a magnetic plate 14 having no protruding magnetic bodies, and Hall elements 21 and 22 are mounted on an outer surface of the housing 60. An annular permanent magnet 10 having a shaft 15 integral therewith is mounted on the device in question, specifically, for example, the rotary shaft that turns in accordance with the depression of the accelerator pedal. Spacers 90 of a non-magnetic material are sandwiched between the magnetic plates 13, 14 and a magnet plate 30. In addition, a housing cover 61 is fixedly mounted on the magnet plate 30.

Signal lines from the Hall elements 21 and 22 are connected to signal terminals 51 and 56, respectively. Ground lines from the Hall elements 21 and 22 are connected to ground terminals 52 and 55, respectively. In addition, power lines from the Hall elements 21 and 22 are connected to power terminals 53 and 54, respectively.

Capacitors 41 through 44 are provided for cutting off an RF signal noise and a surge voltage between the signal line from the Hall element 21 and the ground terminal, between the signal line from the Hall element 22 and the ground terminal, between the power line from the Hall elements 21 and the ground terminal, and between the power line from the Hall element 22 and the ground terminal, respectively.

According to the embodiments of the present invention described heretofore, the magnetic plates 11, 12, 13, 14, and 30 are of a rectangular shape with corners thereof beveled off. It is to be understood that the invention is not limited to such a shape only. It may be a shape of, for example, a disc, a semi-circle, a sector, a trapezoid or the like.

Figure 19:
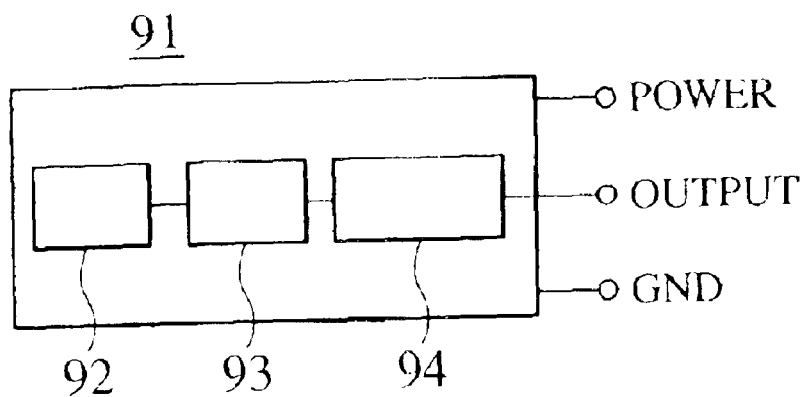
FIG. 19 is a plan view of a Hall IC that functions as a magnetic induction element.
Figure 20:
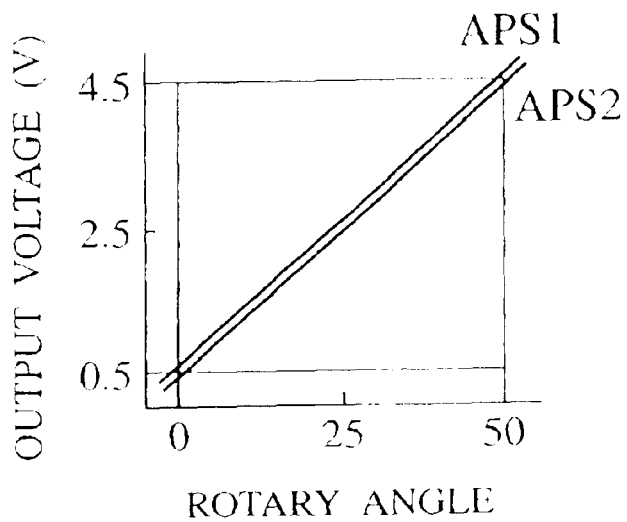
FIG. 20 is a diagram showing a first output characteristic of the Hall IC.
Figure 21:
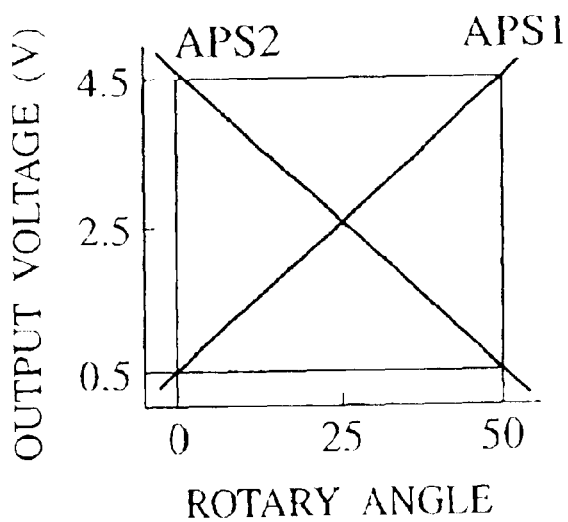
FIG. 21 is a diagram showing a second output characteristic of the Hall IC.

Finally, the magnetic induction elements 21 and 22 will be described. FIG. 19 shows a Hall IC 91 that is made up of a magnetic induction element 92, a signal amplifier 93, and a zero-span adjusting and temperature correcting unit 94. The Hall IC 91 may be used as the magnetic induction elements 21 and 22. Two different types of outputs may be set for the magnetic induction elements 21 and 22 as shown in FIGS. 20 and 21. FIG. 20 represents an A characteristic that yields in-phase signals (in-phase outputs), while FIG. 21 represents a B characteristic that yields signals with opposite phases from each other (cross outputs). The A characteristic can be obtained by simply configuring the magnetic induction elements 21 and 22 in the same manner. The following two methods may be used, on the other hand, to obtain the B characteristic. Specifically, according to the first method, the Hall IC 91 is installed so that the Hall elements 92 vertically face each other, that is, if one of the Hall elements faces upward, the other faces downward. Thus, the direction of the magnetic flux entering the magnetic induction element 21 is thereby made opposite to that entering the magnetic induction element 22. According to the second method, the Hall elements 92 are faced in the same direction. Meanwhile, the signal amplifier 93 in one of the Hall ICs 91 amplifies a signal as a positive one. While the signal amplifier 93 in the other Hall IC 91 amplifies a signal into a negative one. According to this embodiment of the present invention, an effect that diversifies the range of application of signal outputs from the magnetic induction elements 21 and 22 can be obtained.

Modes for carrying out the present invention will be enumerated in the following.

[Mode 1]

In mode 1, there is provided a noncontact rotary position sensor comprising: a permanent magnet having a circular or a circularly arcuate outer circumference; a shaft fixedly supporting the permanent magnet; upper and lower magnetic plates sandwiching the permanent magnet from above and below, at least one of the upper and lower magnetic plates being separated in a horizontal direction by way of an air gap; at least one protruding magnetic body disposed between the upper and lower magnetic plates; and at least two adjacent magnetic induction elements disposed on a protruding surface of the protruding magnetic body, wherein a rotor composed of the permanent magnet and the shaft is rotatable relatively in relation to the upper and lower magnetic plates, the permanent magnet is magnetized substantially in an axial direction of rotation, and an amount of magnetic flux passing through the at least two magnetic induction elements is varied when the permanent magnet turns.

[Mode 2]

In mode 2, there is provided the noncontact rotary position sensor according to mode 1, characterized in that two magnetic induction elements are disposed in parallel with each other on the protruding surface of at least one protruding magnetic body disposed between the upper and lower magnetic plates.

[Mode 3]

In mode 3, there is provided the noncontact rotary position sensor according to mode 1, characterized in that two magnetic induction elements overlapped one on the other are disposed on the protruding surface of at least one protruding magnetic body disposed between the upper and lower magnetic plates.

[Mode 4]

In mode 4, there is provided the noncontact rotary position sensor according to any one of modes 1 to 3, characterized in that the upper and lower magnetic plates provided with at least one protruding magnetic plate is provided with a single-step or a multiple-step recess that is made at a portion corresponding to the immediate back of the protruding magnetic body.

[Mode 5]

In mode 5, there is provided the noncontact rotary position sensor according to mode 4, characterized in that at least one protruding magnetic body disposed between the upper and lower magnetic plates and the recess located on the opposite side of the protruding magnetic body are manufactured through extrusion molding of the magnetic plate.

[Mode 6]

In mode 6, there is provided the noncontact rotary position sensor according to any one of modes 1 to 5, characterized in that the permanent magnet is of a circularly arcuate shape having a radial width.

[Mode 7]

In mode 7, there is provided the noncontact rotary position sensor according to any one of modes 1 to 5, characterized in that the permanent magnet is disc-shaped.

[Mode 8]

In mode 8, there is provide the noncontact rotary position sensor according to any one of modes 1 to 5 and 7, characterized in that the permanent magnet is magnetized to at least two poles as viewed in an axial direction of rotation.

[Mode 9]

In mode 9, there is provided the noncontact rotary position sensor according to any one of modes 1 to 8, characterized in that a width of the air gap between the permanent magnet and the upper and lower magnetic plates is 0.5 mm or more, or preferably around 1 mm.

[Mode 10]

In mode 10, there is provided the noncontact rotary position sensor according to any one of modes 1 to 9, characterized in that the flux density inside the magnetic material is 0.5 T or less.

[Mode 11]

In mode 11, there is provided the noncontact rotary position sensor according to any one of modes 1 to 10, characterized in that signal outputs from the two adjacent magnetic induction elements are set in opposite phase.

[Mode 12]

In mode 12, there is provided the noncontact rotary position sensor according to any one of modes 1 to 11, characterized in that the magnetic plate and a member securing the magnetic plate are integrally formed through plastic molding.

[Mode 13]

In mode 13, there is provided a throttle valve assembly characterized by comprising: an annular or semi-annular magnet mounted on one end of a throttle valve; a plastic cover mounted on a main body provided with the throttle valve; an auxiliary cover mounted on the plastic cover; a magnetic path forming member that is mounted on the plastic cover and the auxiliary cover and that sandwiches the annular or semi-annular magnet so as to form a magnetic path; a magnetic flux converging portion that is located inside the magnetic path so as to allow a magnetic flux passing the magnetic path to converge at a specific location; and at least two adjacent magnetic induction elements that are mounted in the magnetic flux converging portion and that detects a change in the magnetic flux at the magnetic flux converging portion occurring as a result of rotation of the throttle valve.

[Mode 14]

In mode 4, there is provided a noncontact rotary position sensor characterized by comprising: a permanent magnet; a magnetic path member that allows a magnetic flux produced by the permanent magnet to pass therethrough; a magnetism converging portion provided in the magnetic path member to allow the magnetic flux passing through the magnetic path member to converge at a specific location; at least two adjacent magnetic induction elements disposed at the magnetism converging portion so as to detect a change in the magnetic flux occurring in the magnetic path as a result of a relative rotation between the magnetic path member and the permanent magnet; and a magnetism shielding magnetic member that surrounds the magnetic path member while being in noncontact with the magnetic path member.

According to these modes, the magnetic flux can be effectively made to converge at the location where the magnetic induction elements are mounted. This yields an effect that a noncontact rotary position sensor offering high accuracy and sensitivity can be obtained.

Another effect that can be yielded is that the arrangement, in which two magnetic induction elements are disposed on one side, contributes to a simplified routing of various cables connected to the magnetic induction elements, which offers increased ease of mass production.

Still another effect that can be yielded is that hysteresis of the signals from the magnetic induction elements can be minimized thanks to the recess formed on the backside of the protruding magnetic body of the magnetic plate.

An embodiment, in which a noncontact rotary position sensor according to preferred embodiments of the present invention is built into an electronic control throttle valve apparatus for an internal combustion engine as a throttle position sensor, will be described with reference to FIG. 24.

Figure 24:
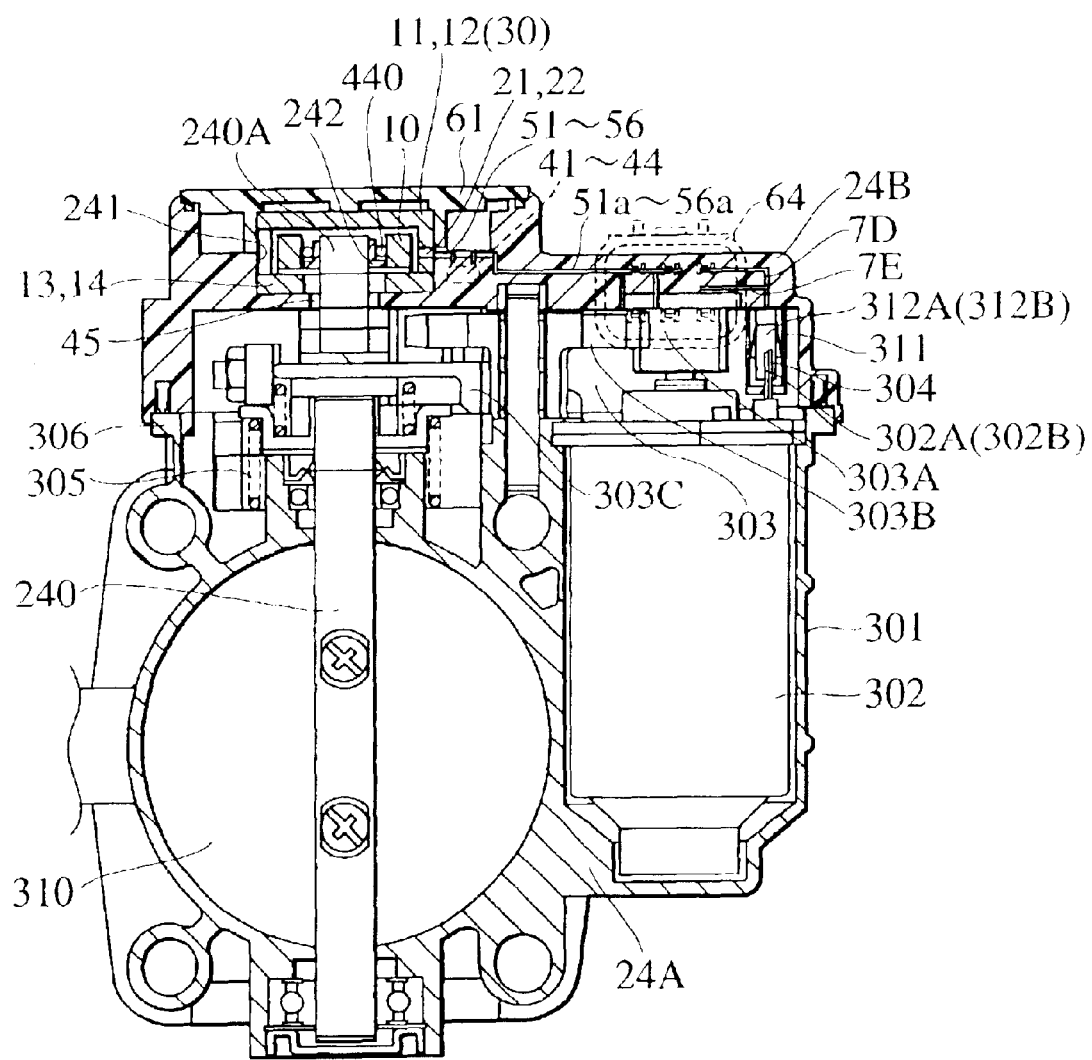
FIG. 24 is a cross-sectional view of an electronic control throttle valve apparatus for an internal combustion engine provided with a sensor according to the embodiments of the present invention.

FIG. 24 is a longitudinal sectional view of the noncontact rotary position sensor (throttle position sensor) according to the embodiment mounted in a throttle body 24A that controls an air flow rate of the engine. In FIG. 24, like reference numerals have been used as those used for other embodiments to denote like or common parts.

The basic construction of the rotary position sensor (throttle position sensor) according to this embodiment is the same as that of the embodiment shown in FIG. 16 and the like.

The rotary position sensor of this embodiment differs from that of other embodiments in that a sensor housing 241 thereof is formed on a cover (gear cover) 24B of a gear mechanism 303 mounted in a throttle body 24A.

A motor housing 301 that accommodates therein a motor 302 for driving a throttle shaft 240, the gear mechanism 303, and a gear housing 306 that accommodates therein a default mechanism are formed integrally into the throttle body 24A. The gear cover 24B, on which the sensor housing 241 is formed, covers the gear housing 306.

A terminal 302A and a ground terminal 302B of the motor 302 are connected to intermediate terminals 312A and 312B, respectively, provided on the gear cover 24B by way of a connecting bracket 311.

A power drive from the motor 302 is transmitted by way of the gear mechanism 303 (a pinion 303A, an intermediate gear 303B, and a final gear 303C) to the throttle shaft 240, which drives the throttle valve 310.

A hole 45 is bored in the sensor housing portion of the gear cover 24B. One end of the throttle shaft 240 passes through this hole 45 to terminate inside the sensor housing 241.

An annular permanent magnet 10 is secured by way of a retaining element 242 to a distal end 240A of the throttle shaft 240 in the same manner as in the embodiment shown in FIG. 16. A metallic C-ring 440 prevents the throttle shaft from coming off.

The following arrangements of the parts accommodated in the sensor housing 241 provided on the gear cover 24B are substantially the same as those in the embodiment shown in FIG. 16. The specific arrangements are: the retention structure and layout of the magnetic plates 13 and 14 that make up a lower stator; layout of the Hall ICs 21 and 22; leader construction (guide construction) of the input and output terminals 51 through 56; connecting arrangement provided between the input and output terminals 51 through 56 and capacitors 41 through 44; and connection construction with external connection terminals 51a through 56a.

In addition, the magnetic plates 11 and 12 that make up an upper stator are held in position, being sandwiched between a cover 61 and the gear cover 24B that forms the sensor housing. This arrangement is again the same as that employed in the embodiment shown in FIG. 16.

The rotary position sensor according to this embodiment differs from the embodiment shown in FIG. 16 secondly in the layout of a connector 64 and external connection terminals 51a through 56a thereof and the wiring pattern from the input and output terminals 51 through 56 to leading edges of external connection terminals 51a through 56a.

The connector 64 is integrally formed on a side face of the gear cover 24B and located at a position away from the sensor housing 241.

The input and output terminals 51 through 56 used for the two Hall ICs of the rotary position sensor as shown in FIG. 16 and motor terminals 7D and 7E for throttle drive are connected to the external connection terminals 51a through 56a that are insert-molded in the connector 64. According to this embodiment, a power terminal VDD and a GND terminal are shared by the two Hall ICs 21 and 22.

That is, although not shown in the connector of the embodiment in FIG. 24, the total number of external connection terminals involved with the rotary position sensor (throttle position sensor) is four, i.e., one power terminal VDD, one ground terminal, and two sensor input and output terminals. If the power terminal and the ground terminal for the motor are added to these external connection terminals for the rotary position sensor, the total number of the external connection terminals is six, which are laid out in two rows, each having three. (Although FIG. 16 shows six in total, the input and output terminals and the connection conductors for the Hall ICs, they are actually bundled up into a more concise total of four.)

The conductor that corresponds to the power terminal VDD, the conductor that corresponds to the ground terminal, the conductor that corresponds to the sensor output terminal, and the two conductors that correspond to the motor terminals are embedded in the gear cover 24B through insert molding.

Of a terminal block of external connection terminals 51a through 56a, the conductor for power is branched at a midway point into two, each end of which is extracted to a joint with the ground terminal of each of the Hall ICs 21 and 22.

Part of the terminal block of external connection terminals 51a through 56a is exposed for connection to circuit devices such as the capacitors 41 through 44 and the like. Of these, there are one exposed portion that corresponds to the power conductor, two exposed portions 7B that correspond to the ground conductor, and one exposed portion that corresponds to the sensor output conductor.

These conductor exposed portions are placed in the order of the sensor output conductor exposed portion, the ground conductor exposed portion, the power conductor exposed portion, the ground conductor exposed portion, and the sensor output conductor exposed portion.

The capacitors 41 through 44 and other circuit devices are connected between the sensor output conductor exposed portion and the ground conductor exposed portion, between the power conductor exposed portion and the ground conductor exposed portion 7B", and between the ground conductor exposed portion and the sensor output conductor exposed portion, respectively. These circuit devices are shown by broken lines in FIG. 24 because each of these devices is inserted into a recess (a hole) provided between the corresponding conductor exposed portions.

According to this embodiment, the same effects can be obtained as those of the embodiment shown in FIG. 16. In addition to these effects, this embodiment can even further streamline the external connection terminals and insert-molded wiring harnesses.

Sensors of this type as the prior art are known from Japanese Patent Nos. 2,842,482 and 2,920,179, and U.S. Pat. Nos. 5,789,917 and 6,137,288. In these prior art sensors, attention is focused on the fact that, if the permanent magnet is the rotor, the flux density in a circumferential direction in the stator is linearly distributed in relation to the rotating direction of the rotor. In order to prevent the magnetic field distribution in the stator from being affected by the rotary position of the rotor fitted with the magnet as much as feasible, the shape of opposing faces of the rotor and the stator is configured so that the length in the direction perpendicular to the rotating direction becomes uniform. The basic arrangement of these prior art sensors differs from the magnetic path configuration according to the preferred embodiments of the present invention in this respect.

According to the embodiments of the present invention, it is possible to obtain a compact noncontact rotary position sensor or an electronic control throttle valve control apparatus provided with the compact noncontact rotary position sensor without sacrificing accuracy.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A noncontact rotary position sensor comprising:
    a permanent magnet mounted on an end portion of a shaft, an angular position of which is to be detected;
    a pair of stators proximal to said permanent magnet for constituting a magnetic path in which a magnetic flux being generated by said permanent magnet passes through;
    a magnetism throttling portion formed in a part of said pair of stators;
    two magnetic induction elements disposed at said magnetism throttling portion;
    plural terminals formed on one side of said two magnetic induction elements so as to receive signals from said two magnetic induction elements; and
    a housing for holding said pair of stators, said two magnetic induction elements, and said plural terminals and also providing a connector portion for electrical connecting to an outer portion at an outer periphery thereof;
    wherein said plural terminals are electrically connected to an end portion of a terminal of a side of said connector portion and at an inner side of said housing; wherein said plural terminals have bent portions between a side in which said plural terminals are connected to said two magnetism induction elements and a side in which said plural terminals are connected to said connector portion; and
    wherein terminal portions of a side of said two magnetism induction elements and a terminal portion of a side of said connector portion, each having a different terminal arrangement width, are electrically connected and are held in said receiving case.

2. A noncontact rotary position sensor according to claim 1, wherein
    said plural terminals are plural signal terminals, which are formed on said two magnetism induction elements.

3. A noncontact rotary position sensor according to claim 1, wherein
    said terminal of said connector portion has a bent portion.

4. A noncontact rotary position sensor according to claim 1, wherein
    said plural terminals are plural signal terminals, which are formed on said two magnetism induction elements, and
    said terminal connector portion side has a bent portion.

5. An electronic control throttle valve apparatus provided with a nonconact rotary position sensor according to claim 1, comprising:
    a motor mounted on a body; and
    reduction gears for transmitting a rotation of said motor to a gear secured on a throttle shaft;
    the electronic control throttle valve apparatus, wherein
    said receiving case is mounted on said body and functions as a resin covering member for covering said reduction gears;
    said permanent magnet is mounted on a throttle shaft to which one of said reduction gears is mounted; and
    said plural signal terminals of said two magnetism induction elements and a terminal of said motor are connected to said terminal of said connector portion formed on said receiving case.

6. An electronic control throttle valve provided with a noncontact rotary position sensor according to claim 5, wherein
    said permanent magnet is annular.

7. An electronic control throttle valve provided with a noncontact rotary position sensor according to claim 5, wherein
    said magnetic induction element is a Hall element or Hall IC.

8. An electronic control throttle valve provided with a noncontact rotary position sensor according to claim 5, wherein
    signal outputs from said two magnetic induction elements are in a phase or in an opposite phase.

9. A noncontact rotary position sensor according to claim 1, wherein
    said permanent magnet is annular.

10. A noncontact rotary position sensor according to claim 1, wherein said magnet induction element is a Hall element or a Hall IC.

11. A noncontact rotary position sensor according to claim 1, wherein signal outputs from said two magnetic induction elements are in a phase or in an opposite phase.

* * * * *